(12) United States Patent
Alawieh et al.

(10) Patent No.: US 10,809,088 B2
(45) Date of Patent: Oct. 20, 2020

(54) METHOD AND DEVICE FOR PREDICTING A CONSTRUCTION-RELATED DRIVING-ROUTE CHANGE OF A DRIVING ROUTE FOR A VEHICLE

(71) Applicant: Robert Bosch GmbH, Stuttgart (DE)

(72) Inventors: Ali Alawieh, Abstatt (DE); Carsten Hasberg, Ilsfeld-Auenstein (DE); Danny Hiendriana, Ludwigsburg (DE); Fabian Dominik Reister, Bad Liebenzell (DE); Jan-Hendrik Pauls, Grossbottwar (DE); Muhammad Sheraz Khan, Heilbronn (DE); Philipp Rasp, Wannweil (DE); Valentin Frommherz, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 132 days.

(21) Appl. No.: 16/119,391

(22) Filed: Aug. 31, 2018

(65) Prior Publication Data

US 2019/0072404 A1    Mar. 7, 2019

(30) Foreign Application Priority Data

Sep. 5, 2017   (DE) .................. 10 2017 215 505

(51) Int. Cl.
| | |
|---|---|
| *G01C 21/36* | (2006.01) |
| *G06K 9/00* | (2006.01) |
| *G01C 21/34* | (2006.01) |
| *G01C 21/32* | (2006.01) |

(52) U.S. Cl.
CPC ...... *G01C 21/3602* (2013.01); *G01C 21/3415* (2013.01); *G06K 9/00624* (2013.01); *G06K 9/00791* (2013.01); *G01C 21/32* (2013.01)

(58) Field of Classification Search
CPC ............ G01C 21/3602; G01C 21/3415; G01C 21/32; G06K 9/00791; G06K 9/00624; G08G 1/0967; G08G 1/096725; G08G 1/096833; G08G 1/0969
See application file for complete search history.

(56) References Cited

U.S. PATENT DOCUMENTS

| | | | | |
|---|---|---|---|---|
| 6,317,686 | B1* | 11/2001 | Ran .................. | G01C 21/3691 701/117 |
| 2014/0278031 | A1* | 9/2014 | Scofield .......... | G08G 1/096888 701/118 |
| 2014/0278074 | A1* | 9/2014 | Annapureddy ...... | G08G 1/0141 701/468 |

(Continued)

FOREIGN PATENT DOCUMENTS

DE    102014201210 A1    7/2015

*Primary Examiner* — Jess Whittington
*Assistant Examiner* — Brian E Yang
(74) *Attorney, Agent, or Firm* — Norton Rose Fulbright US LLP; Gerard Messina

(57) ABSTRACT

A method for predicting a construction-related driving-route change of a driving route for a vehicle includes at least a step of reading in and a step of detecting. In the step of reading in, at least one image signal is read in, which represents an image, recorded by the vehicle, of a construction-site parameter in the environment of the driving route. In the step of detecting, the impending driving-route change is detected using the image signal.

17 Claims, 2 Drawing Sheets

(56) References Cited

U.S. PATENT DOCUMENTS

| | | | |
|---|---|---|---|
| 2015/0066412 A1* | 3/2015 | Nordbruch | G01D 18/002 |
| | | | 702/104 |
| 2016/0321513 A1* | 11/2016 | Mitti | G06K 9/3258 |
| 2017/0242436 A1* | 8/2017 | Creusot | G08G 1/096816 |
| 2018/0209801 A1* | 7/2018 | Stentz | G01C 21/3415 |
| 2018/0238698 A1* | 8/2018 | Pedersen | G05D 1/0217 |

* cited by examiner

METHOD AND DEVICE FOR PREDICTING A CONSTRUCTION-RELATED DRIVING-ROUTE CHANGE OF A DRIVING ROUTE FOR A VEHICLE

CROSS-REFERENCE TO RELATED APPLICATIONS

The present application claims priority under 35 U.S.C. § 119 to DE 10 2017 215 505.1, filed in the Federal Republic of Germany on Sep. 5, 2017, the content of which is hereby incorporated by reference herein in its entirety.

BACKGROUND

A highly automated vehicle localizes itself in previously prepared maps, which include traffic lanes, for example. If the map and the sensor measurements of the vehicle do not agree with each other because of changes in the driving route, then this could lead to an undesired or incorrect behavior of a vehicle that is driving in a highly automated manner. A rapid identification of changes that are occurring on the driving route is therefore of great importance but also quite challenging because the sensor resolution in the distance is low in most cases and noise or interference such as reflections can also be superposed to the driving-route changes to be identified.

The document DE 10 2014 201 210 A1 describes a method for ascertaining a danger spot in the environment of a vehicle by identifying a danger spot and a person in the environment of the vehicle.

SUMMARY

Against this background, the approach presented here introduces a method for predicting a construction-related driving-route change of a driving route for a vehicle, and also a device that uses this method and, finally, a corresponding computer program.

Advantages that are able to be achieved by the introduced approach are that a method introduced here makes it possible to detect a future construction site along a driving route as well as a related future change in the driving route, this being accomplished by taking into account construction-site parameters in the environment of the driving route that suggest the future construction site along the driving route. Thanks to the highly likely impending construction sites detected in advance, map-change detectors are able to be made sensitive to this region of the driving route, so that greater safety in road traffic is able to be ensured.

According to an example embodiment of the present invention, a method for predicting a construction-related driving-route change of a driving route for a vehicle includes at least a step of reading in and a step of detecting. In the step of reading in, at least one image signal, which is recorded by the vehicle and represents an image of a construction-site parameter in the environment of the driving route, is read in. In the step of detecting, the impending driving-route change is detected with the aid of the image signal.

The vehicle can be a vehicle that is driving in a highly automated manner and is designed to be controlled across the driving route without an interaction with the driver or without a control by a driver of the vehicle. For example, the method introduced here can be implemented in software or hardware, or in a mixed form of software and hardware, e.g., in a device or in a control unit for the vehicle. Since construction sites in the area of driving routes, e.g., traffic lanes or roads, frequently run through a predictable process, such a construction site is able to be predicted with a high degree of probability already on the basis of the detected construction-site parameters in the environment of the driving route. The impending driving-route change can be understood as an impending construction-related change in the driving route that will likely occur in the future, for instance as a result of a traffic lane that will be closed in the future. The impending driving-route change can include information about an impending future course of the driving route and/or information about the fact that a change is to be expected with regard to the current course of the driving route. The construction site might not yet exist at the time when the steps of the method are executed, so that no driving-route change attributable to construction is present at the current time. An environment of the driving route can be understood as a region that is located adjacent to a road. A construction-site parameter can be understood as an object whose presence suggests a future construction site. Such an object might not yet lead to a change in the driving route, e.g., because the object is currently still located adjacent to a traffic lane. The information pertaining to the impending change in the driving route can be used to make preparations for updating map material that does not currently include the impending change in the driving route.

In the step of reading in, the image of the construction-site parameter recorded by the vehicle can therefore represent a construction-site parameter which is located away from or outside the driving route. This makes it possible to identify impending construction sites along the driving route in advance and in a particularly timely manner.

In the step of reading in, the recorded image can represent the construction-site parameter, which represents at least one construction-site vehicle, a construction worker, a construction-site container, and/or a construction-site sign. Such construction-site parameters are typical of impending construction work and are frequently placed outside the driving route already prior to the impending construction measures.

In the step of reading in, the image signal can be read in, which represents the image of the construction-site parameter in the area of the driving route recorded by a camera device, in particular a 3D-camera and/or a surround camera, and/or a video device, in particular a stereo-video device of the vehicle. Prior to that, a signal corresponding to the image signal can be received and provided by the camera device and/or the video advice in a step of receiving.

In order to allow for a spatial and/or temporal assessment of the detected impending driving-route change, it is advantageous if the present method has a step of associating, which is executed in response to the step of detecting. In the step of associating, the impending driving-route change can be associated in a spatial and/or temporal context. For example, this can be done using a spatial association method, for instance by reading in at least one position signal of the vehicle and/or a map signal. In addition or as an alternative, the step of associating can be carried out using a temporal association method, for instance by reading in a time signal which indicates a current time of day, for example. A possible night construction site, for example, can be inferred with the aid of the temporal association method.

In the step of detecting, the impending driving-route change can also be classified using a neural network. This makes it possible to allocate even further detected impending driving-route changes that were identified by the vehicle or other vehicles in a rapid and simple manner.

In an example embodiment, the method includes providing the detected impending driving-route change, e.g., in the form of the image, to at least one device which is disposed externally from the vehicle, which can allow for a combination or evaluation of the detected impending driving route changes, for instance with the aid of a server. Such a server can have access to a multitude of detected impending driving-route changes of the vehicle or to a multitude of detected impending driving-route changes of a plurality of vehicles. In the step of providing, the impending driving-route change can be transmitted to the corresponding device. In the step of providing, the detected impending driving-route change is able to be provided, e.g., via a C2C link, to at least one further vehicle or to a plurality of further vehicles. A C2C communication, also known as car-to-car, is an exchange of information and data between motor vehicles. Additionally or alternatively, the impending driving-route change is able to be made available, e.g., via a C2I link, to at least one infrastructure device or to a plurality of infrastructure devices. A C2I communication, also known as a car-to-infrastructure, denotes an exchange of data between a vehicle and a surrounding infrastructure.

In order to sensitize a map-change detector, the present method can include a step of adapting, in which at least one detection parameter of the map-change detector is adapted with the aid of the detected impending driving-route change. The map-change detector can be adapted using the spatially and/or temporally associated and/or classified detected impending driving-route change. For example, a construction site that is subsequently actually found along the driving route is advantageously able to be detected by the map-change detector in a more rapid and robust manner.

The approach presented here furthermore provides a device, which is developed to carry out, actuate and/or implement the steps of a variant of a method introduced here. With the aid of this embodiment variant of the approach in the form of a device, the objective on which the approach is based can likewise be achieved in a rapid and efficient manner.

For this purpose, the device can include at least one processing unit for processing signals or data, at least one memory unit for storing signals or data, at least one interface with respect to a sensor or to an actuator for reading in sensor signals from the sensor or for outputting data or control signals to the actuator, and/or at least one communications interface for reading in or outputting data, which are embedded in a communications protocol. The processing unit, for example, can be a signal processor, a microcontroller or the like, and the memory unit can be a flash memory, an EPROM, or a magnetic memory unit. The communications interface can be developed for reading in or outputting data in a wireless and/or wire-bound manner. A communications interface that is able to read in or output wire-bound data has the capability of reading in these data, e.g., electrically or optically, from a corresponding data-transmission line or of outputting the data into a corresponding data-transmission line.

In this context, a device can be understood as an electrical device, which processes sensor signals and outputs control and/or data signals as a function thereof. The device can have an interface, which is able to be developed in the form of hardware and/or software. In the case of a hardware design, the interfaces can be part of what is known as a system ASIC, for example, which includes a wide variety of functions of the device. However, it is also possible that the interfaces are discrete integrated switching circuits or are at least partially made up of discrete components. In the case of a software development, the interfaces can be software modules, which are provided on a microcontroller in addition to other software modules, for example.

In an example embodiment, the device controls a prediction of a construction-related driving-route change of a driving route for a vehicle. The device can access sensor signals, e.g., at least one image signal, for this purpose. The actuation at least takes place via actuators such as a read-in device for reading in the image signal, and a detection device for detecting the impending driving-route change, using at least the image signal.

According to an example embodiment of the present invention, a computer-program product or a computer program having program code, is stored on a machine-readable carrier or memory medium such as a semiconductor memory, a hard disk memory, or an optical memory, and is used for executing, implementing, and/or actuating the steps of the present method according to one of the afore-described embodiments, in particular when the program product or the program is executed on a computer or on a device.

Exemplary embodiments of the approach introduced here are shown in the drawing and elucidated in greater detail in the following description.

DETAILED DESCRIPTION

Figure 1:
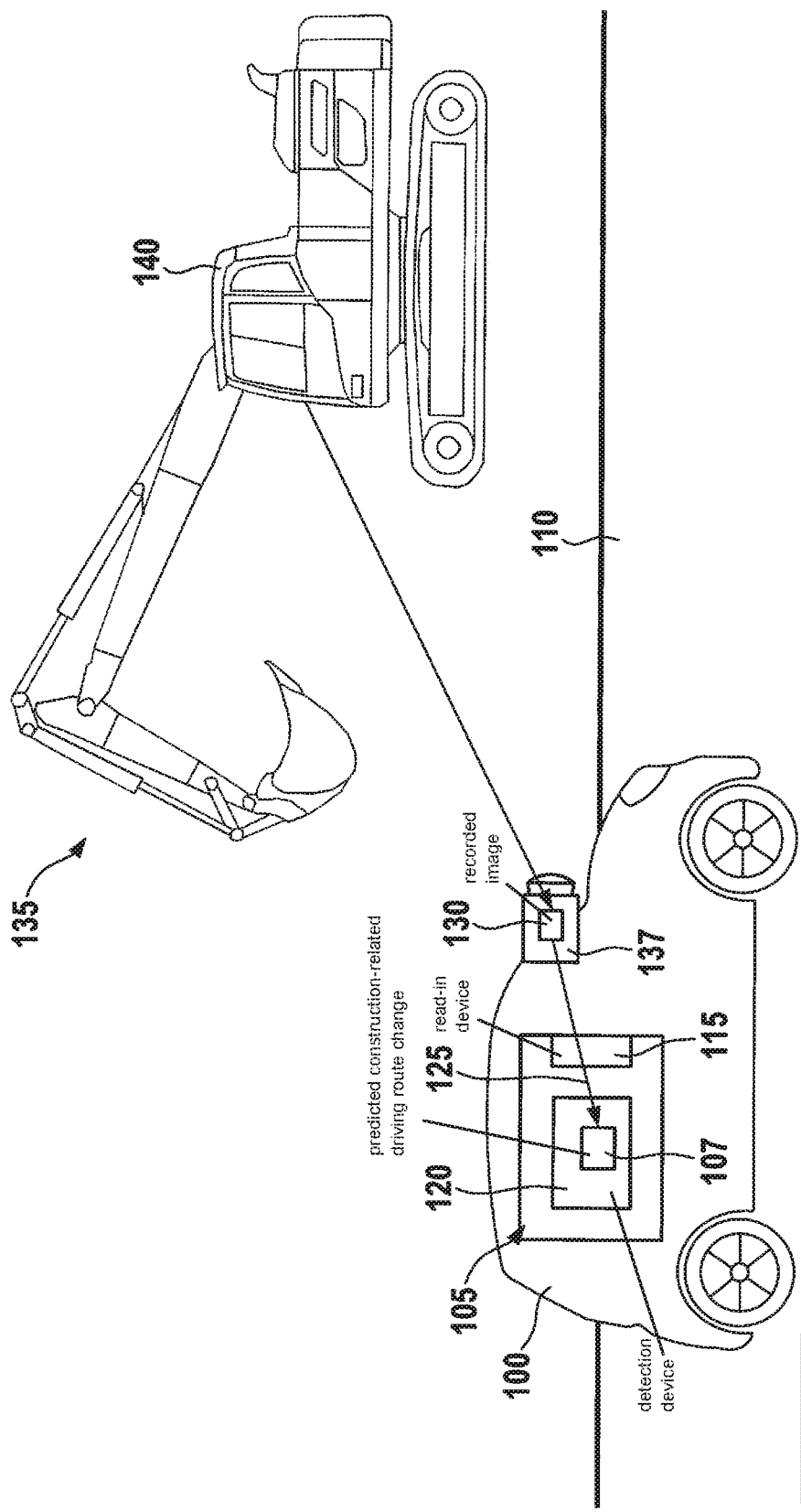
FIG. 1 schematically illustrates a vehicle having a device for predicting a construction-related driving-route change of a driving route according to an example embodiment of the present invention.

In the following description of advantageous exemplary embodiments of the present invention, identical or similar reference numerals are used for the elements that are shown in the various figures and have a similar effect, while a repeated description of these elements is omitted.

If an exemplary embodiment includes an "and/or" linkage between a first feature and a second feature, then this should be read as indicating that the exemplary embodiment according to one example embodiment includes both the first and the second feature, and according to a further example embodiment, that it includes either only the first feature or only the second feature.

FIG. 1 shows a schematic illustration of a vehicle 100 having a device 105 for predicting a construction-related driving-route change 107 of a driving route 110 according to an exemplary embodiment. Device 105 is developed to predict a construction-related driving-route change 107 of driving route 110 for vehicle 100. To do so, device 105 has at least one read-in device 115 and a detection device 120.

Read-in device 115 is developed to read in at least one image signal 125, which represents an image 130, recorded by vehicle 100, of a construction-site parameter 135 in the environment of driving route 110. Detection device 120 is developed to detect the impending driving-route change 107 using image signal 125.

The features of device 105 described in the following text are optional. According to this particular exemplary embodiment, read-in device 115 reads in image signal 125, which represents image 130 of construction-site parameter 135 in the region of driving route 110 recorded by a camera device 137, which is a 3D camera in this instance, and/or according to an alternative exemplary embodiment, a surround camera and/or a video device, in particular a stereo video device, of vehicle 100.

In addition, according to this exemplary embodiment, read-in device 115 reads in image signal 125, which represents recorded image 130 of construction-site parameter 135, which is disposed away from driving route 110.

According to this exemplary embodiment, recorded image 130 represents construction-site parameter 135, which represents at least one construction-site vehicle 140 and/or according to an alternative exemplary embodiment, a construction worker and/or a construction-site container, and/or a construction-site sign.

Moreover, device 105 is developed to associate impending driving-route change 107 with a spatial and/or temporal context in response to the detection of impending driving-route change 107, and to classify it using a neural network.

In addition, device 105 is developed to make impending driving-route change 107 available to at least one device disposed externally from vehicle 100 or to transmit it to at least one device disposed externally from vehicle 100.

According to this exemplary embodiment, device 105 is developed to adapt at least one detection parameter of a map-change detector based on the detected impending driving-route change 107.

In the following text, details of device 105 will be described once again in more detail. Device 105 introduced here allows for an image-based prediction of route changes in the construction area based on a route environment for highly automated driving.

In the future, a multitude of highly/fully automated driving functions will be available for vehicles 100. Vehicle 100 drives in a highly automated manner in these functions, which means that the driver no longer bears the responsibility. Important for the highly/fully automated driving is a localization in a highly precise map. In other words, vehicle 100 or the function should know the exact location of vehicle 100 at all times. This of course requires a correct, i.e., fault-free, map that matches reality.

Known map-based driving functions for highly automated driving assume the validity of the map used. In other words, it is assumed that the map correctly represents reality. However, if the reality has changed, the map is outdated and no longer valid. A few examples of such changes would be lane markings that take a different course after being painted over, changed positions of road infrastructure devices such as guiderails and/or bridges, erected construction sites, and/or newly added or removed or repositioned traffic signs or signposts. After such changes, map-based, highly automated driving functions or assistance functions will most likely no longer function correctly. For this reason, a map validation is required in which the map is checked for correctness and it is ensured that the map matches the reality.

In this context, the validation of individual map elements is accomplished by comparing the sensor data of vehicle 100 to the map. If the sensor data are in agreement with the map, then the map element is considered validated. If the data do not agree, then the map is outdated and can no longer be used, or be used only to a limited extent.

Highly automated vehicle 100 localizes itself in previously prepared maps, which include traffic lanes, for instance. If the map and the sensor measurements do not agree, then this can lead to an undesired and also incorrect behavior. Route changes should therefore be detected as early as possible so that sufficient reaction time remains for highly automated vehicle 100. In addition, this segment of the route change can be charted and imported into the system in the form of an update. A detection of route changes that have already taken place with the aid of known methods is very challenging since a sensor resolution in the distance is often low and noise or interference such as reflections can frequently be superposed to the route changes to be detected. A gradual process can have the result that vehicle 100 detects construction-related roadblocks or other road users only very late. Device 105 introduced here is able to circumvent all of this because it already detects an impending driving-route change 107 before it even occurs. In other words, device 105 advantageously makes it possible to detect future map errors in a timely and robust manner.

In addition, device 105 improves a detection rate of map-change detectors, abbreviated as MCD, in the environment of a construction site.

In the following text, a possible function of device 105 will be described again in different terms. With the aid of camera device 137, in combination with device 105, the regions away from the road in the form of driving route 110 are checked for features such as construction-site vehicles 140 and/or construction workers and/or construction-site containers and/or construction-site signs that were not placed along driving route 110 but will only be placed there sometime in the future. These features, previously referred to as construction-site parameters 135, are associated in a spatial as well as a temporal context in device 105. Because of the spatial association, it is possible to predict a possible change in the upcoming route segment of driving route 110, and because of the temporal component, it is possible to predict night construction sites, for example, or also further changes in the future on this route segment. Detected features are forwarded to other vehicles with the aid of C2C and/or to infrastructure devices with the aid of C2I. Detected features from multiple vehicles 100 are able to be combined on a server. This improves the MCD. Based on the detected features, parameters of MCDs are subsequently adapted so that they detect driving-route changes with a higher probability. The features can be detected using sensors such as video, e.g., stereo video, and/or camera device 137, e.g., a 3D camera and/or a surround camera. According to this exemplary embodiment, a neural network is used for classifying the features.

Figure 2:
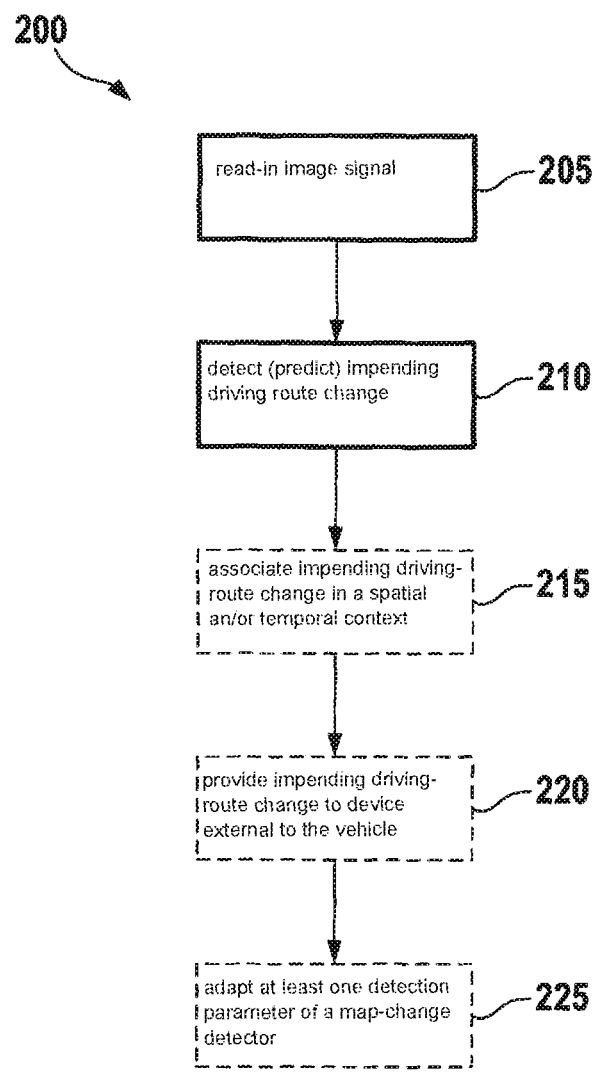
FIG. 2 is a flowchart of a method for predicting a construction-related driving-route change of a driving route for a vehicle, according to an example embodiment of the present invention.

FIG. 2 is a flowchart of a method 200 for predicting a construction-related driving-route change of a driving route for a vehicle according to an exemplary embodiment. This can be a method 200, which is able to be executed by the device described on the basis of FIG. 1.

Method 200 includes at least a step 205 of reading in and a step 210 of detecting. In step 205 of reading in, at least one image signal, which represents an image of a construction-site parameter in the environment of the driving route and was recorded by the vehicle, is read in. In step 210 of detecting, the impending driving-route change is detected using the image signal.

The exemplary embodiments and steps of method 200 described in the following text are optional. According to an example embodiment, in step 205 of reading in, the image of the construction-site parameter, recorded by the vehicle, in which the construction-site parameter is disposed away from the driving route, is read in.

According to this example embodiment, in step 205 of reading in, the recorded image in which the construction-site parameter represents at least one construction-site vehicle and/or a construction worker and/or a construction-site container and/or a construction-site sign, is read in.

According to this exemplary embodiment, in step 205 of reading in, the image signal, which represents the image of the construction-site parameter in the region of the driving route that was recorded by a camera device, in particular a 3D camera, and/or a video device, in particular a stereo video device of the vehicle, is read in.

According to this exemplary embodiment, in step 210 of detecting, the impending driving-route change is classified using a neural network.

Optionally, the present method also has a step 215 of associating, a step 220 of providing, and a step 225 of adapting. In step 215 of associating, the impending driving-route change is associated in a spatial and/or temporal context in response to step 210 of detecting. In step 220 of providing, the impending driving-route change is provided to at least one device disposed externally from the vehicle, in response to step 210 of detecting. In step 225 of adapting, at least one detection parameter of a map-change detector is adapted using the detected impending driving-route change.

The method steps introduced here can be executed repeatedly and also in a sequence other than the described sequence.

What is claimed is:

1. A method comprising the following steps: recording, using a camera of a vehicle, an image of a construction-site parameter in an environment of a driving route of the vehicle; reading in, by a control unit of the vehicle, at least one image signal that includes the recorded image of the construction-site parameter in the environment of the driving route of the vehicle; predicting, using the control unit, an impending construction-related driving-route change of the driving route based on the read-in image signal, the impending construction-related driving-route change including a future closing of a traffic lane that is currently open; and transmitting the predicted impending construction-related driving-route change to at least one device disposed externally to the vehicle; wherein the control unit includes at least hardware.

2. The method of claim 1, wherein the construction-site parameter is of a site adjacent to the driving route of the vehicle.

3. The method of claim 1, wherein the construction-site parameter represents: a construction-site vehicle, and/or a construction worker, and/or a construction-site container, and/or a construction-site sign.

4. The method of claim 1, wherein the camera is a video camera of the vehicle.

5. The method of claim 1, wherein the camera is a 3D camera of the vehicle.

6. The method of claim 1, wherein the camera is a stereo video camera of the vehicle.

7. The method of claim 1, further comprising associating the predicted impending construction-related driving route change to at least one of a spatial context and a temporal context.

8. The method of claim 1, further comprising classifying the predicted impending construction-related driving route change using a neural network.

9. The method of claim 1, further comprising adapting at least one detection parameter of a map-change detector based on the predicted impending construction-related driving route change.

10. The method as recited in claim 1, wherein the transmitting step includes transmitting the predicted impending construction-related driving-route change to another vehicle using car-to-car (C2C) communication.

11. The method as recited in claim 1, wherein the transmitting step includes transmitting the predicted impending construction-related driving-route change to an infrastructure device using car-to-infrastructure (C2I) communication.

12. A device of a vehicle, the device comprising a processor interfacing with a camera of the vehicle, wherein the processor is configured to: record, using the camera of the vehicle, an image of a construction-site parameter in an environment of a driving route of the vehicle; read in, by the processor of the vehicle, at least one image signal that includes the recorded image of the construction-site parameter in the environment of the driving route of the vehicle; predict, using the processor, an impending construction-related driving-route change of the driving route based on the read-in image signal, the impending construction-related driving-route change including a future closing of a traffic lane that is currently open; and transmit the predicted impending construction-related driving route change to at least one device disposed externally to the vehicle; wherein the processor includes hardware.

13. The device as recited in claim 12, wherein the processor is configured to transmit the predicted impending construction-related driving-route change to another vehicle using car-to-car (C2C) communication.

14. The device as recited in claim 12, wherein the processor is configured to transmit the predicted impending construction-related driving-route change to an infrastructure device using car-to-infrastructure (C2I) communication.

15. A non-transitory computer-readable medium on which are stored instructions that are executable by a processor of a vehicle and that, when executed by the processor, cause the processor to perform a method, the method comprising the following steps: recording, using a camera of the vehicle, an image of a construction-site parameter in an environment of a driving route of the vehicle; reading in, by the processor of the vehicle, at least one image signal that includes the recorded image of the construction-site parameter in the environment of the driving route of the vehicle; predicting, using the processor, an impending construction-related driving-route change of the driving route based on the read-in image signal, the impending construction-related driving-route change including a future closing of a traffic lane that is currently open; and transmitting the predicted impending construction-related driving-route change to at least one device disposed externally to the vehicle; wherein the processor includes at least hardware.

16. The non-transitory computer-readable medium as recited in claim 15, wherein the transmitting step includes transmitting the predicted impending construction-related driving-route change to another vehicle using car-to-car (C2C) communication.

17. The non-transitory computer-readable medium as recited in claim 15, wherein the transmitting step includes transmitting the predicted impending construction-related driving-route change to an infrastructure device using car-to-infrastructure (C2I) communication.

* * * * *